UNITED STATES PATENT OFFICE.

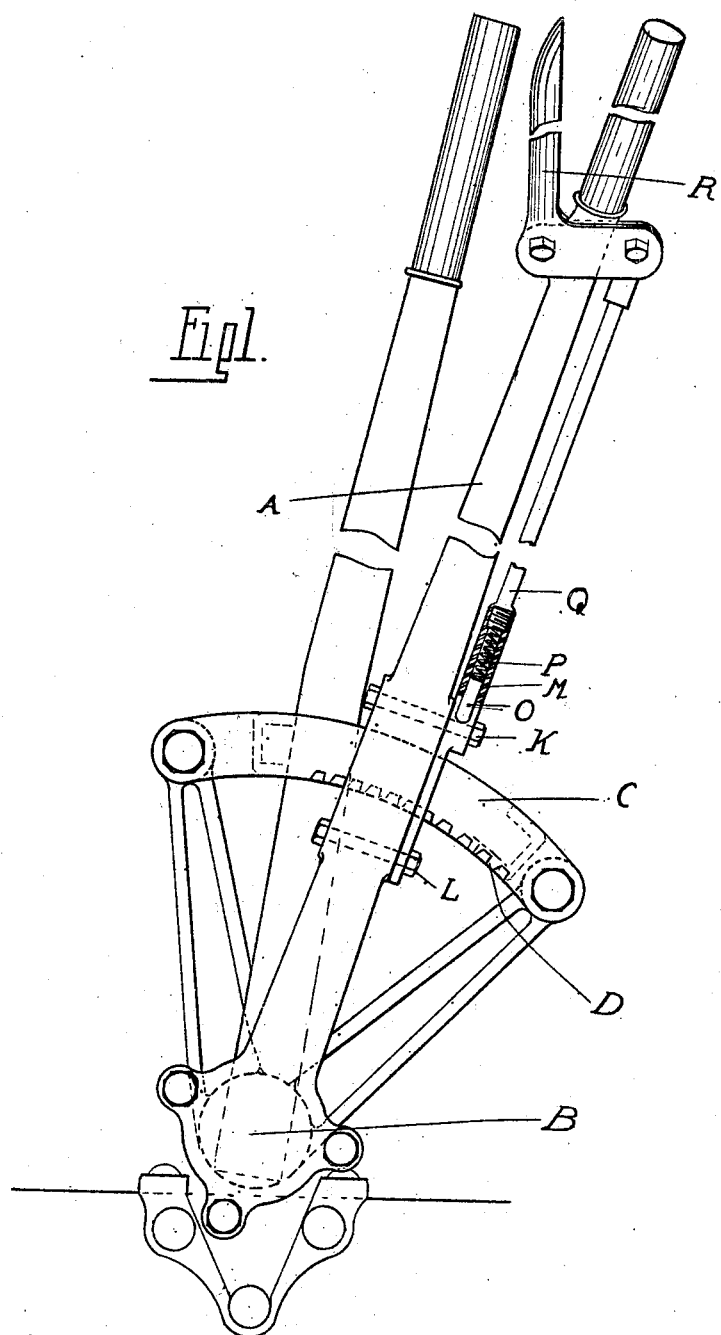

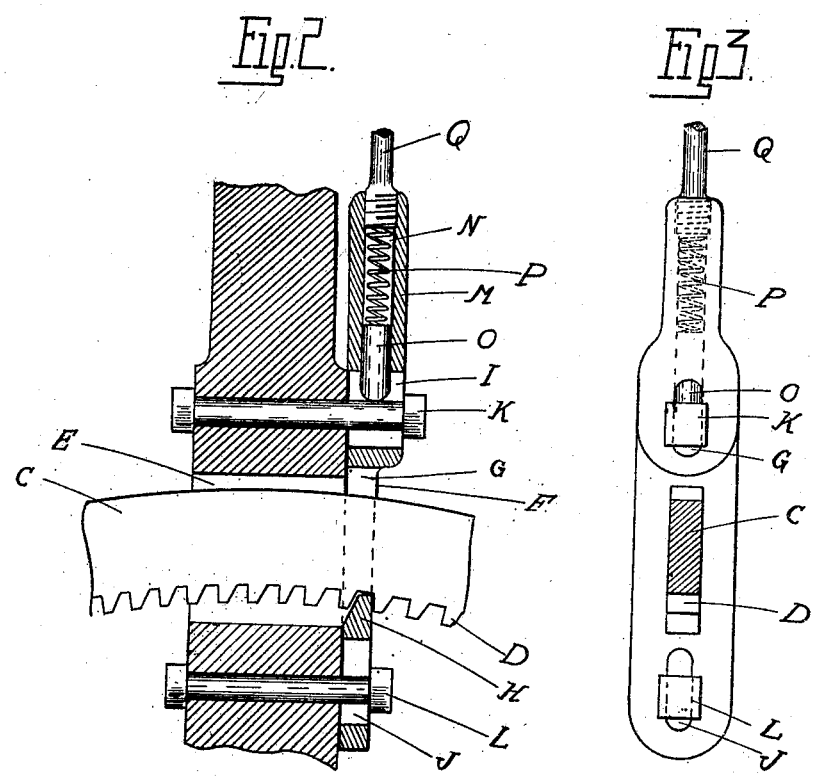

HOWARD E. COFFIN, OF DETROIT, MICHIGAN.

LEVER-LOCKING MEANS.

No. 890,964.

Specification of Letters Patent.

Patented June 16, 1908.

Application filed October 15, 1907. Serial No. 397,543.

*To all whom it may concern:*

Be it known that I, HOWARD E. COFFIN, a citizen of the United States of America, residing at Detroit, in the county of Wayne and State of Michigan, have invented certain new and useful Improvements in Lever-Locking Means, of which the following is a specification, reference being had therein to the accompanying drawings.

The invention relates to controlling mechanism for motor vehicles, and has particular reference to the locking means for holding the controlling lever in different positions of adjustment.

The invention consists in the novel construction, arrangement and combination of parts as hereinafter set forth.

In the drawings—Figure 1 is an elevation of the controlling mechanism to which my improvement is applied; Fig. 2 is an enlarged vertical longitudinal section thereof; and Fig. 3 is a section at right angles to Fig. 2.

A is the controlling lever, which is fulcrumed at B, and extends adjacent to a fixed segment C. This segment is provided on its under side with a series of notches D, and preferably passes through a slot E in the lever.

The locking mechanism for this lever comprises a member F, which is arranged at one side of the lever E, and is slotted at G for registration with the slot E for the passage of the segment C. At the lower end of the slot G, the member F is preferably slightly beveled to form a ratchet tooth H for engagement with the notches D in the segment, this portion being preferably hardened. Above and below the slot G are the slots I and J, through which are passed securing bolts K and L for holding the member F to the lever, while permitting a limited longitudinal adjustment thereof. Above the slot I is a portion M which is bored to form a recess N extending from the upper end of the member F into the slot I. Within this recess is slidably arranged a pin O, and above this pin a spring P, which at its upper end abuts against the lower end of a rod Q secured to the member F preferably by threaded engagement therewith. The rod Q extends parallel to the lever, and at its upper end is connected to a bell crank R, forming an operating handle for the latch.

In operation, the tension of the spring P will cause it to press oppositely upon the pin O and the rod Q. The pin will thus be forced downward until it bears against the bolt K in the slot I, which permits a fixed stop, preventing further movement of the pin. On the other hand, the upward pressure of the spring bearing against the rod Q will force this rod upward, carrying with it the member F, which slides upon the bolts K and L, and forcing the tooth H into engagement with one of the notches D in the segment C, thus locking the lever from movement. The lever is released by grasping the bell crank R, which is adjacent to the handle of the lever, this causing the downward movement of the rod Q and member F compressing the spring P and disengaging the tooth H from the notch D.

It will be observed that both the spring P and pin O are concealed from view, and that the whole construction is an exceedingly simple and effective one.

What I claim as my invention is:

1. The combination with a lever and a segment therefor, of a member having a recess therein embracing said segment and slidably secured to said lever, a pin slidably located in the recess in said member, a spring within said recess bearing against said pin, a stop on said lever against which said pin rests whereby the tension of said spring will force said member into locking engagement with said segment, and means for moving said member oppositely against the tension of said spring to disengage it from said segment.

2. The combination with a lever and a segment therefor notched on its under side, of a member having a longitudinal slot therein embracing said segment and having a tooth for engaging the notches, a bolt passing through the longitudinal slot in said member for slidably holding the latter to said lever, a pin in said longitudinal slot bearing against said bolt, a spring between said pin and a bearing on said member for forcing said tooth into engagement with the notch and segment, and means for moving said member against the tension of said spring to disengage the tooth from the notch in the segment.

3. The combination with a lever, having a transverse slot therein of a segment notched on its under side passing through the transverse slot in said lever, a member adjacent to said lever having a registering slot through which the segment passes, a bolt passing through a longitudinal slot in said member and through said lever for slidably securing the former to the latter, a concealed pin in a recess in said member which opens into said longitudinal slot, a spring concealed in said recess bearing against said pin and at its opposite end against the bearing on said member whereby the latter is forced upward into engagement with a notch on the under side of said segment, and a rod connected to said member for moving it in the opposite direction against the tension of said spring.

4. The combination with a lever and a segment notched on its under side, of the member F slotted at G for the passage therethrough of said notched segment, and having a tooth H at the lower end of said slot for engaging a notch in said segment, said member also having a longitudinal slot and a recess, the bolt K passing through the longitudinal slot and securing the member F to said lever, a pin O located in the recess, the rod Q secured to said member having said recess and the spring P in said recess between said rod and pin, substantially as and for the purpose described.

In testimony whereof I affix my signature in presence of two witnesses.

HOWARD E. COFFIN.

Witnesses:
NELLIE KINSELLA,
JAMES P. BARRY.